US008936853B2

(12) United States Patent
Schattka et al.

(10) Patent No.: US 8,936,853 B2
(45) Date of Patent: Jan. 20, 2015

(54) ADHESIVE AGENTS FOR PLASTISOLS

(75) Inventors: Jan Hendrik Schattka, Hanau (DE); Gerd Loehden, Essen (DE); Marita Kaufmann, Griesheim (DE); Winfried Belzner, Gruendau (DE); Michael Wolff, Rodenbach (DE); Rainer Lomoelder, Muenster (DE); Dirk Hoppe, Nottuln (DE); Christoph Nacke, Schermbeck (DE)

(73) Assignee: Kaneka Belgium N.V., Westerlo-Oevel (BE)

( * ) Notice: Subject to any disclaimer, the term of this patent is extended or adjusted under 35 U.S.C. 154(b) by 202 days.

(21) Appl. No.: 12/674,690

(22) PCT Filed: Aug. 12, 2008

(86) PCT No.: PCT/EP2008/060557
§ 371 (c)(1),
(2), (4) Date: Feb. 23, 2010

(87) PCT Pub. No.: WO2009/027219
PCT Pub. Date: Mar. 5, 2009

(65) Prior Publication Data
US 2011/0111238 A1 May 12, 2011

(30) Foreign Application Priority Data
Aug. 24, 2007 (DE) .......................... 10 2007 040 304

(51) Int. Cl.
| C08F 20/54 | (2006.01) |
| B32B 15/09 | (2006.01) |
| C08L 39/00 | (2006.01) |
| C09D 133/14 | (2006.01) |
| C08F 220/34 | (2006.01) |
| C08G 18/80 | (2006.01) |
| C08J 3/18 | (2006.01) |
| C08K 5/00 | (2006.01) |

(52) U.S. Cl.
CPC ............ *C09D 133/14* (2013.01); *C08F 220/34* (2013.01); *C08G 18/8061* (2013.01); *C08J 3/18* (2013.01); *C08G 2190/00* (2013.01); *C08J 2333/06* (2013.01); *C08K 5/0016* (2013.01); *C08L 2312/00* (2013.01)
USPC ........... 428/463; 428/402; 428/407; 526/304; 524/555

(58) Field of Classification Search
CPC .......... C08F 20/54; B32B 15/09; C08L 39/00
See application file for complete search history.

(56) References Cited

U.S. PATENT DOCUMENTS

| 4,239,866 | A | * | 12/1980 | Reitel et al. ............... 525/440.07 |
| 5,155,154 | A | * | 10/1992 | Krummel et al. ............ 524/114 |
| 5,741,824 | A | * | 4/1998 | Butschbacher et al. ...... 427/195 |
| 6,894,108 | B1 | * | 5/2005 | Kasai et al. .................... 524/556 |
| 2002/0103286 | A1 | * | 8/2002 | Speier et al. .................. 524/492 |
| 2003/0232908 | A1 | | 12/2003 | Eto et al. |
| 2006/0106168 | A1 | | 5/2006 | Ota et al. |
| 2006/0148929 | A1 | | 7/2006 | Nakayama et al. |
| 2009/0137740 | A1 | | 5/2009 | Mae et al. |

FOREIGN PATENT DOCUMENTS

| DE | 34 42 646 | 5/1986 |
| EP | 1 283 229 | 2/2003 |
| EP | 1 371 674 | 12/2003 |
| JP | 2002 212373 | 7/2002 |
| JP | 2004-18537 A | 1/2004 |
| WO | 2004-050739 A1 | 6/2004 |

OTHER PUBLICATIONS

DESMOCAP 11, product datasheet, Mar. 2013.*

* cited by examiner

*Primary Examiner* — Randy Gulakowski
*Assistant Examiner* — Jeffrey Washville
(74) *Attorney, Agent, or Firm* — Westerman, Hattori, Daniels & Adrian, LLP

(57) ABSTRACT

The invention relates to plastisols which even without the addition of adhesion promoters exhibit high adhesion to metallic and cathodically deposition-coated substrates.

32 Claims, No Drawings

ADHESIVE AGENTS FOR PLASTISOLS

The invention relates to plastisols which even without the addition of adhesion promoters exhibit high adhesion to metallic and cathodically deposition-coated substrates.

By plastisols are meant, generally speaking, dispersions of finely divided polymer powders in plasticizers, which undergo gelling, i.e. curing, when heated to relatively high temperatures.

Plastisol: by "plastisols" herein are meant mixtures which are composed of at least one binder and plasticizer. Plastisols may additionally comprise, for example, further binders, further plasticizers, fillers, rheological assistants, stabilizers, adhesion promoters, pigments and/or blowing agents.

Binder: by binders herein are meant polymeric compounds which generally take the form of a fine powder. Through swelling (absorption of the plasticizer) the binders lead to the setting (gelling) of the plastisol. The binders are critically responsible, among other things, for the formation and the cohesion of a plastisol film.

Polymer: by polymer herein is meant, generally speaking, the result of a polymerization.

This polymerization can be performed, for example, as a batch, semibatch or continuous process. The polymerization process in this case may be, for example, suspension, solution or emulsion polymerization.

Moreover, the polymerization can be, among other things, multi-staged, for example; different monomers or monomer mixtures can be used, and/or complex feed methods (e.g. power feed) can be employed. The polymers specified in this text serve as binders for plastisols.

Primary particles: by "primary particles" herein are meant the particles present following emulsion polymerization in the resultant dispersion (latex).

Secondary particles: by "secondary particles" herein are meant the particles obtained by drying the dispersions (latices) resulting from the emulsion polymerization.

(Meth)acrylates: this notation refers herein both to the esters of methacrylic acid (such as methyl methacrylate, n-butyl methacrylate and cyclo-hexyl methacrylate, for example) and to the esters of acrylic acid, and also to mixtures thereof.

Particle size: reference herein to a particle size, an average particle size or an average size of the particles, unless expressly stated otherwise, is to the volume-weighted average of the particle size distribution as obtainable, for example, by means of laser diffraction (with the aid, for instance, of a Coulter LS 13 320, manufactured by Beckman-Coulter).

Such plastisols, which occasionally are also referred to as "organosols", find application for a very wide variety of purposes, more particularly as a sealing and sound insulation compound, as underbody protection for motor vehicles, as anti-corrosion coatings for metals, as a coating on sheet metal strips (coil coating), for impregnating and coating substrates made from textile materials and paper (including, for example, coatings on the back of carpets), as floor coatings, as finishing coat compounds for floor coatings, for synthetic leather, as cable insulations, and many more.

One important field of application of plastisols is in the protection of metal bodywork panels on the underbody of motor vehicles against stone chipping. This application imposes particularly exacting requirements on the plastisol pastes and on the gelled films.

An essential prerequisite, of course, is a high level of mechanical resistance to the abrasion occasioned by stone chipping. Moreover, an equally indispensable factor in the automotive industry is a maximum useful life of the plastisol pastes (storage stability).

The plastisol pastes must not have a propensity to absorb water, since water absorbed prior to gelling evaporates and leads to unwanted blistering at the high temperatures during the gelling operation.

Furthermore, the plastisol films are required to exhibit effective adhesion to the substrate (usually cathodically electrocoated sheet metal), which not only is an important prerequisite for the abrasion properties but also, furthermore, is vital for the anti-corrosion protection.

By far the most frequently used polymer, in volume terms, for the preparation of plastisols is polyvinyl chloride (PVC).

PVC-based plastisols display good properties and, moreover, are relatively inexpensive, this being one of the main reasons for their continued widespread use.

In the course of the preparation and use of PVC plastisols, however, a range of problems occur. The very preparation of PVC itself is not without its problems, since the workers at the production sites are exposed to a health hazard from the monomeric vinyl chloride. Residues of monomeric vinyl chloride in the PVC, moreover, might also be hazardous to health in the course of further processing or for the end users, although the levels are generally only in the ppb range.

A particularly serious factor associated with the application of PVC plastisols is that the PVC is both heat-sensitive and light-sensitive and has a propensity to give off hydrogen chloride. This is a grave problem in particular when the plastisol must be heated to a relatively high temperature, since the hydrogen chloride liberated under these conditions has a corrosive action and attacks metallic substrates. This is particularly significant when, in order to shorten the gelling time, comparatively high baking temperatures are employed, or when, as in the case of spot welding, temperatures occur which are locally high.

The greatest problem arises when wastes comprising PVC are disposed of: besides hydrogen chloride, it is possible under some circumstances for dioxins to be formed, which are highly toxic. In conjunction with steel scrap, PVC residues can lead to an increase in the chloride content of the molten steel, which is likewise deleterious.

For the reasons stated, research and ongoing development have been taking place for quite some time into alternatives to PVC plastisols which possess their good processing properties and end-use properties, but without the problems associated with the chlorine they contain.

Such proposals have included, for example, the replacement of vinyl chloride polymers, at least in part, by acrylic polymers (JP 60 258241, JP 61 185518, JP 61 207418). This approach, however, has only lessened, rather than solved, the problems occasioned by the chlorine content.

A variety of polymers—typically, however, not those prepared exclusively by emulsion polymerization—have been investigated as chlorine-free binders; examples have included polystyrene copolymers (e.g. DE 4034725) and polyolefins (e.g. DE 10048055). With regard to their processing properties and/or the properties of the pastes or of the gelled films, however, such plastisols fail to meet the requirements imposed by users on the basis of their many years of experience with PVC plastisols.

A good alternative to PVC, however, are poly(meth)acrylates, which for many years already have been described for the preparation of plastisols (e.g. DE 2543542, DE 3139090, DE 2722752, DE 2454235).

The use of plastisols based on poly(meth)acrylates, for example, in automotive engineering, generally necessitates the use of adhesion promoters in order to ensure sufficient adhesion to the substrate—often metal or cathodically electrocoated sheet metal.

In this connection, blocked isocyanates—which are usually used in conjunction with amine derivatives as curing agents—in particular have become established. (As examples there may be mentioned EP 214495, DE 3442646, DE 3913807.)

Although these adhesion promoters are pretty expensive, and are not unobjectionable in terms of storage and handling, their use is nowadays state of the art, especially when requirements are exacting.

Various patent texts refer to the possibility of improving the adhesion of the binder itself through the incorporation of particular monomers.

Examples of monomers specified have included nitrogen-containing monomers (e.g. DE 4030080). DE 4130834 describes a plastisol system featuring improved adhesion to cataphoretic sheet metal, based on polyacrylic (meth)acrylates, the binder comprising an acid anhydride as well as monomers with an alkyl substituent of 2-12 carbon atoms.

The improvement in the adhesion afforded by such monomers is, generally speaking, not very great, and in order, nevertheless, to achieve a significant improvement in the adhesion it is necessary to use correspondingly high quantities of these monomers. This in turn has an effect on other properties of the plastisol, such as the storage stability or the absorbency for plasticizers, for instance.

The object was to provide a plastisol whose binder features improved adhesion, so that the addition of additional adhesion promoters can be dispensed with, or their proportion in the plastisol mixture can be reduced.

The object has been achieved by a plastisol based on a halogen-free polymer, characterized in that polymers are included which contain isocyanate groups which have been blocked by protective groups.

Surprisingly it has been found that the polymers of the invention, as binders in plastisols, lead to outstanding adhesion properties to metallic and cathodically deposition-coated substrates. It is therefore possible, in whole or in part, to dispense with the use of adhesion promoters.

Contact during the handling and storage of the plastisols with the adhesion promoters, which are usually toxic, does not occur or at least is reduced.

The isocyanate content of the polymer is preferably 0.02% to 5.0%, more preferably 0.05% to 2.0%, with particular preference 0.1-1.0%, by weight. The isocyanate content here is to be calculated as the weight of the unprotected isocyanate groups (NCO, i.e. 42 g/mol) relative to the total weight of the polymer. Any isocyanate groups present which are not available again as a result of removal of a protective group remain disregarded in the calculation.

The protective groups of the isocyanates are advantageously deblocked at the gelling temperatures of the plastisol. Typically the deblocking of the protective groups of the isocyanates takes place at above 100° C., preferably at above 120° C.

In one preferred embodiment of the invention the isocyanate group is anchored via a (meth)acrylate group in the backbone of the polymer.

Preference is given in this context to monomers which are based on diisocyanates one of whose isocyanate groups is reacted with an OH-bearing ester of (meth)acrylic acid and the other of whose isocyanate groups has been blocked by a protective group.

Such monomers have the general structure

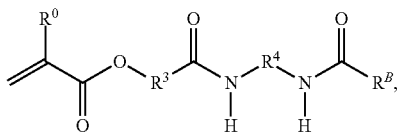

where
$R^0$ is a methyl group or a hydrogen,
$R^3$ is any desired organic radical,
$R^4$ is any desired organic radical and
$R^B$ is a protective group.

The radical $R^3$ identifies a spacer, which is typically derived from a diol, for example a polyetherdiol, or from a polyalkoxyalkylene having terminal OH groups. It is also possible to use spacers derived from oligomeric polyesters having terminal OH groups.

Particular preference is given to radicals selected from the group

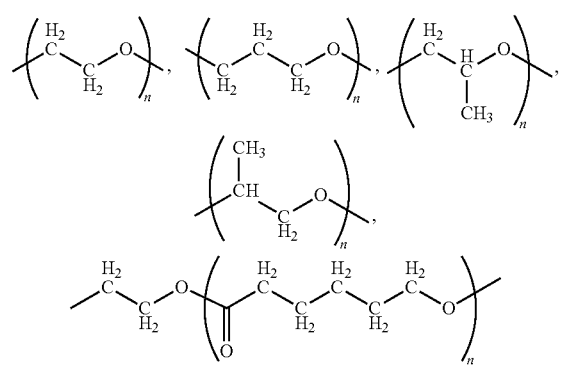

where n is an integer between 1 and 6.

The radical $R^4$ is derived from a diisocyanate, i.e. $R^4$ is the radical to which the two isocyanate groups are attached.

The diisocyanates forming the basis for $R^4$ may be any desired aromatic, aliphatic, cycloaliphatic and/or (cyclo) aliphatic diisocyanates.

Aromatic diisocyanates here may in principle be all known compounds. Particularly suitable are 1,3- and 1,4-phenylene diisocyanate, 1,5-naphthalene diisocyanate, toluidine diisocyanate, 2,6-tolylene diisocyanate, 2,4-tolylene diisocyanate (2,4-TDI), 2,4'-diphenylmethane diisocyanate (2,4'-MDI), 4,4'-diphenylmethane diisocyanate, the mixtures of monomeric diphenylmethane diisocyanates (MDI) and oligomeric diphenylmethane diisocyanates (polymer-MDI), xylylene diisocyanate and tetramethylxylylene diisocyanate.

Suitable aliphatic di- or polyisocyanates possess advantageously 3 to 16 carbon atoms, preferably 4 to 12 carbon atoms, in the linear or branched alkylene radical, and suitable cycloaliphatic or (cyclo)-aliphatic diisocyanates possess advantageously 4 to 18 carbon atoms, preferably 6 to 15 carbon atoms, in the cycloalkylene radical. Under (cyclo) aliphatic diisocyanates the skilled person adequately understands NCO groups attached cyclically and aliphatically at the same time, as is the case, for example, for isophorone diisocyanate. Conversely, cycloaliphatic diisocyanates are understood as those which have NCO groups only attached directly on the cycloaliphatic ring, e.g. $H_{12}MDI$. Examples are cyclohexane diisocyanate, methyl-cyclohexane diisocyanate, ethylcyclohexane diisocyanate, propylcyclohexane diisocyanate, methyl-diethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanato-1,8-octane diisocyanate (TIN), decane diisocyanate, undecane diisocyanate, dodecane diisocyanates.

Preferably $R^4$ derives from isophorone diisocyanate (IPDI), hexamethylene diisocyanate (HDI), diisocyanato-dicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI). Very particular preference is given to the radicals of IPDI, HDI, TMDI and $H_{12}$MDI.

Likewise suitable are the radicals of 4-methylcyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis (cyclohexyl)diisocyanate, 1,4-diisocyanato-4-methylpentane.

It is of course also possible to use mixtures of the diisocyanates.

Particularly preferred are radicals $R^4$ selected from the group

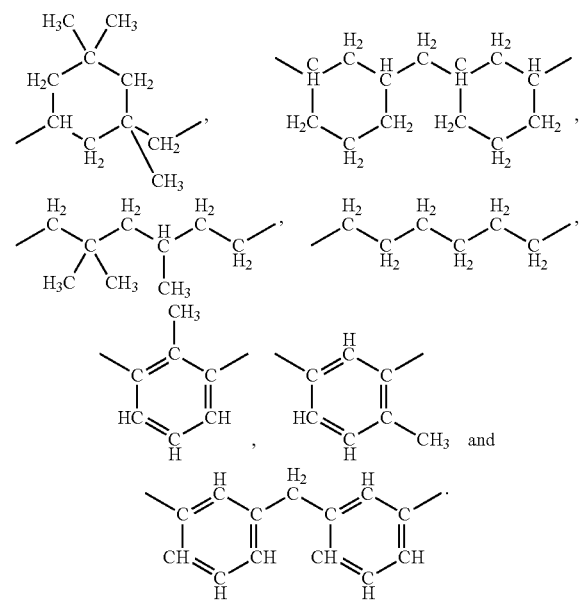

As blocking agents for the isocyanate group it is possible to use all blocking agents.

By way of example it is possible to use phenols such as phenol, and p-chlorophenol, alcohols such as benzyl alcohol, oximes such as acetone oxime, methyl ethyl ketoxime, cyclopentanone oxime, cyclohexanone oxime, methyl isobutyl ketoxime, methyl tert-butyl ketoxime, diisopropyl ketoxime, diisobutyl ketoxime or acetophenone oxime, N-hydroxy compounds such as N-hydroxysuccinimide or hydroxypyridines, lactams such as ε-caprolactam, CH-acidic compounds such as ethyl acetoacetate or malonic esters, amines such as diisopropylamine, heterocyclic compounds having at least one hetero atom such as mercaptans, piperidines, piperazines, pyrazoles, imidazoles, triazoles and tetrazoles, α-hydroxybenzoic esters such as glycolic esters or hydroxamic esters such as benzyl methacrylo-hydroxamate.

Particularly suitable as blocking agents are acetone oxime, methyl ethyl ketoxime, acetophenone oxime, diisopropylamine, 3,5-dimethylpyrazole, 1,2,4-triazole, ε-caprolactam, butyl glycolate, benzyl methacrylo-hydroxamate or methyl p-hydroxybenzoate.

It is of course also possible to use mixtures of these blocking agents.

Protective group $R^B$ is the radical which is attached to the nitrogen of the protected isocyanate group after the reaction of the blocking agent. Particularly preferred as protective group are radicals selected from the group

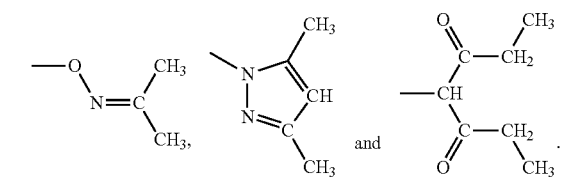

Critical to the function of the monomers in the binder, evidently, is the combination of (meth)acrylate function and protected isocyanate group. The reaction of one of the two groups of a diisocyanate with an OH-containing ester of (meth)acrylic acid is one simple and preferred way of arriving at such a compound. In principle, however, any monomer is suitable in which the protected isocyanate group is attached via a spacer to the (meth)acrylate.

Accordingly, in one particular embodiment of the invention, monomers are used which satisfy the general formula

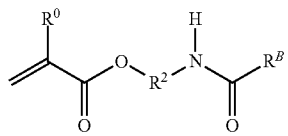

where
$R^0$ is a methyl group or a hydrogen,
$R^2$ is any desired organic radical and
$R^B$ is a protective group ($R^B$ defined as above).

The radical $R^2$ in this case preferably has a molecular weight of not more than 750 g/mol, more preferably not more than 400 g/mol and with particular preference not more than 250 g/mol.

For the invention, however, it is not necessary for an oxygen atom to be attached to the carboxyl group of the (meth) acrylate moiety of the monomer. This is not the case, for example, when the compound is derived from a (meth)acrylamide.

In a further embodiment of the invention, therefore, the monomer satisfies the general formula

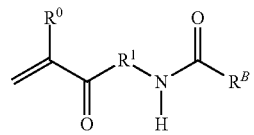

where
$R^0$ is a methyl group or a hydrogen,
$R^1$ is any desired organic radical and
$R^B$ is a protective group (defined as above).

The radical $R^1$ preferably has a molecular weight of not more than 1000 g/mol, more preferably not more than 500 g/mol and with particular preference not more than 300 g/mol.

In one particular embodiment the monomer is derived not from a hydroxyl-containing ester of (meth)acrylic acid but instead from a hydroxyl-containing amide of (meth)acrylic acid—such as, for instance, an alkyl-alkoxyamide. In this embodiment the radical $R^1$ has, for example, the general structure

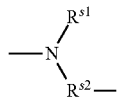

where $R^{s1}$ is a linear or branched alkyl radical and $R^{s2}$ is an alkoxy group reacted with one of the isocyanate groups of a diisocyanate.

In addition it is also possible to use mixtures of the monomers described. This is in part dictated, in fact, by the synthesis of the corresponding monomers, which are actually obtained in the form of mixtures.

The polymer of the invention is constructed to an extent of more than 50%, preferably more than 70%, with particular preference more than 90% by weight of monomers selected from the group of acrylic acid, esters of acrylic acid, methacrylic acid and esters of methacrylic acid and/or mixtures thereof.

The polymer to an extent of more than 30% by weight, preferably to an extent of more than 50% by weight, contains methyl methacrylate.

The polymer is used in the form of particles having a size of 200-5000 nm, preferably having a size of 350-2000 nm, with particular preference having a size of 500-1200 nm.

The binder is composed of primary particles which possess a construction which is made possible by one of the embodiments of the emulsion polymerization—and especially of the semi-continuous emulsion polymerization.

Besides a core/shell construction, including, where appropriate, one with two or more shells around the core, this may also be those structures in which the monomer composition gradually alters from the centre of the particle to its surface (gradient structure).

The particles are composed of a core and at least one shell. The weight of each shell, independently of one another, accounts in each case for at least 10% of the total weight of the particle.

The polymer contains not more than 1.4%, preferably not more than 0.7%, with particular preference not more than 0.3%, by weight of surfactants.

The emulsifier used to prepare the polymer is preferably an alkyl sulphate.

The polymer particles have preferably undergone agglomeration to secondary particles having an average particle size of 5-500 μm, more preferably of 10-200 μm, with particular preference of 20-100 μm.

The process for preparing plastisols based on a halogen-free polymer is characterized in that a) the polymer is prepared by emulsion polymerization, which where appropriate is performed multi-stagedly, b) the polymer is converted into a powder by drying of the resultant dispersion, and this powder c) is subsequently admixed with at least one plasticizer and where appropriate with adhesion promoters and/or fillers and, where appropriate, further constituents typical of plastisols.

Plasticizers include, for example, the following substances:

Esters of phthalic acid, such as diundecyl phthalate, diisodecyl phthalate, diisononyl phthalate, dioctyl phthalate, diethylhexyl phthalate, di-C7-C11-n-alkyl phthalate, dibutyl phthalate, diisobutyl phthalate, dicyclohexyl phthalate, dimethyl phthalate, diethyl phthalate, benzyl octyl phthalate, butyl benzyl phthalate, dibenzyl phthalate and tricresyl phosphate, dihexyl dicapryl phthalate.

Hydroxycarboxylic esters, such as esters of citric acid (for example tributyl O-acetylcitrate, triethyl O-acetylcitrate), esters of tartaric acid or esters of lactic acid.

Aliphatic dicarboxylic esters, such as esters of adipic acid (for example dioctyl adipate, diisodecyl adipate), esters of sebacic acid (for example dibutyl sebacate, dioctyl sebacate, bis(2-ethylhexyl)sebacate) or esters of azelaic acid.

Esters of trimellitic acid, such as tris-(2-ethylhexyl)trimellitate. Esters of benzoic acid, such as benzyl benzoate.

Esters of phosphoric acid, such as tricresyl phosphate, triphenyl phosphate, diphenyl cresyl phosphate, diphenyl octyl phosphate, tris(2-ethylhexyl) phosphate, tris (2-butoxyethyl)phosphate.

Alkylsulphonic esters of phenol or of cresol, dibenzyltoluene, diphenyl ether.

The stated plasticizers and further plasticizers are used individually or as a mixture.

Preference is given to using phthalates, adipates, phosphates or citrates; phthalates are particularly preferred.

Furthermore, the plastisols of the invention may where appropriate comprise further auxiliaries and additives of the kind customary in plastisol technology. These include, for example, coloured pigments, ageing inhibitors, rheological assistants, and also blowing agents for producing foamed plastisols.

These typical additives include, for example, the epoxide plasticizers, preferably epoxidized natural oils such as epoxidized soya bean oil, epoxidized linseed oil or epoxidized tall oils. These epoxide plasticizers are used, as is known, in small amounts, particularly in PVC plastisols, as heat stabilizers.

The plastisols may further comprise the typical ageing inhibitors and stabilizers, rheological assistants such as fumed silicas, bentones, castor oil derivatives, for example.

As fillers it is possible to use all of the fillers that are common in plastisol technology and are known per se. Examples of suitable fillers are finely ground limestone, natural, ground chalks (calcium carbonates or calcium magnesium carbonates), precipitated chalks, heavy spar, talc, mica, clays, pigments such as titanium dioxide, carbon black, iron oxides, for example.

It has been found that optimum results are achieved when, for the preparation of the polymer, an initiator solution is introduced as an initial charge and a monomer emulsion is metered in, to which, at temperatures between 50° C. and 100° C. where appropriate, further monomer emulsions are metered in. In this context it is possible to meter in a variety of monomer emulsions. The metering in of the second and each further monomer emulsion takes place at 70-95° C.

The plastisols of the invention are preferably composed as follows: 100 parts by weight of binder are admixed with 50-300 parts by weight of plasticizer, 40-120 parts by weight of adhesion promoter and/or 0-300 parts by weight of fillers.

The dispersions obtained are typically dried by means of spray drying.

By virtue of their outstanding adhesion properties the plastisols of the invention have a broad field of application. They are used, for example, for coating metallic surfaces. Coating with the plastisol takes place, where appropriate, after electrodeposition coating beforehand. Moreover, the plastisols find use as underbody protection, as seam masking and for damping metal-panel vibrations.

The invention claimed is:

1. Plastisol based on a halogen-free polymer including polymers which contain isocyanate groups which have been blocked by protective groups and bonded to the polymers wherein the isocyanate groups are anchored via (meth)acrylate groups in a backbone of the polymer, and
wherein the polymer is produced by polymerizing monomers selected from the group consisting of monomers of the general formula

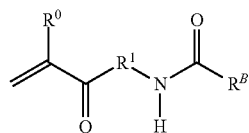

wherein
$R^0$ is a methyl group or a hydrogen,
$R^1$ is any desired organic radical and
$R^B$ is a protective group,
monomers of the general formula

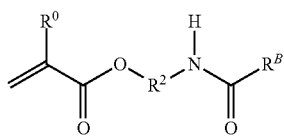

wherein
$R^0$ is a methyl group or a hydrogen,
$R^2$ is any desired organic radical and
$R^B$ is a protective group, and
monomers of the general formula

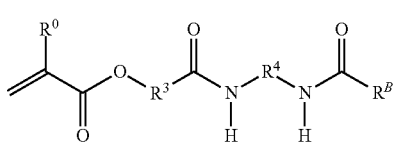

wherein
$R^0$ is a methyl group or a hydrogen,
$R^3$ is any desired organic radical,
$R^4$ is any desired organic radical and
$R^B$ is a protective group.

2. Plastisol based on a halogen-free polymer according to claim 1, characterized in that the isocyanate content of the polymer is 0.02% to 5.0 by weight, the isocyanate content being the weight of the unprotected isocyanate groups relative to the total weight of the polymer.

3. Plastisol based on a halogen-free polymer according to claim 2, characterized in that the isocyanate content of the polymer is 0.1% to 1.0% by weight.

4. Plastisol based on a halogen-free polymer according to claim 1, characterized in that the protective groups of the isocyanates are deblocked at the gelling temperatures of the plastisol.

5. Plastisol based on a halogen-free polymer according to claim 4, characterized in that the protective groups of the isocyanates are deblocked at above 100° C.

6. Plastisol based on a halogen-free polymer according to claim 4, characterized in that the protective groups of the isocyanates are deblocked at above 120° C.

7. Plastisol based on a halogen-free polymer according to claim 1, characterized in that the radical $R^3$ is selected from the group consisting of

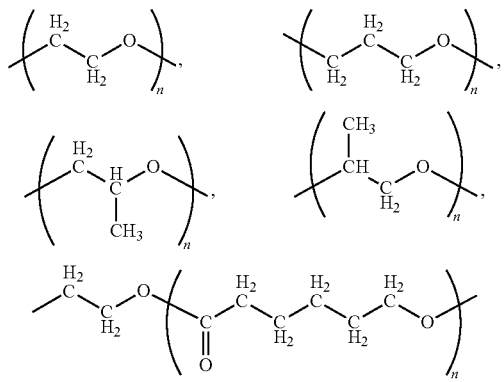

where n is an integer between 1 and 6.

8. Plastisol based on a halogen-free polymer according to claim 1, characterized in that the radical $R^4$ is selected from the group consisting of

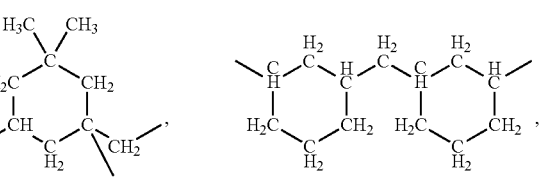

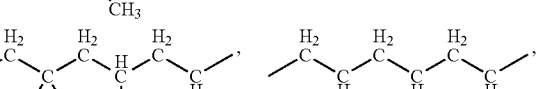

and

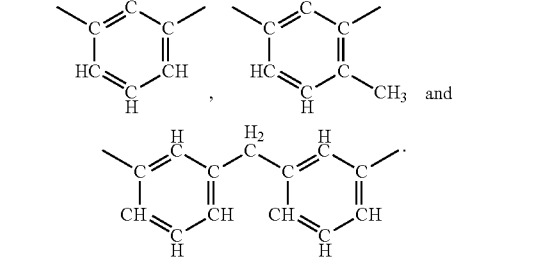

9. Plastisol based on a halogen-free polymer according to claim 1, characterized in that the radical $R^B$ is selected from the group consisting of

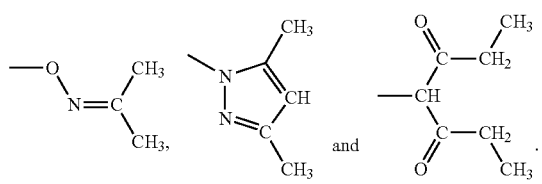

10. Plastisol based on a halogen-free polymer according to claim 1, characterized in that blocking agents used are acetone oxime, methyl ethyl ketoxime, acetophenone oxime, diisopropylamine, 3,5-dimethylpyrazole, 1,2,4-triazole, ε-caprolactam, butyl glycolate, benzyl methacylohydroxamate or methyl p-hydroxybenzoate.

11. Plastisol based on a halogen-free polymer according to claim 1, characterized in that more than 50% by weight of the monomers from which the polymer is constructed are selected from the group consisting of acrylic acid, esters of acrylic acid, methacrylic acid and esters of methacrylic acid and/or mixtures thereof.

12. Plastisol based on a halogen-free polymer according to claim 1, characterized in that the polymer to an extent of more than 30% by weight contains methyl methacrylate.

13. Plastisol based on a halogen-free polymer according to claim 12, characterized in that the polymer to an extent of more than 50% by weight contains methyl methacrylate.

14. Plastisol based on a halogen-free polymer according to claim 1, characterized in that the polymer is used in the form of particles having a size of 200-5000 nm.

15. Plastisol based on a halogen-free polymer according to claim 1, characterized in that the polymer is constructed of primary particles which possess a construction which is made possible by one of the embodiments of the emulsion polymerization—and especially of the semi-continuous emulsion polymerization.

16. Plastisol based on a halogen-free polymer according to claim 15, characterized in that the particles are composed of a core and at least one shell.

17. Plastisol based on a halogen-free polymer according to claim 16, characterized in that the weight of each shell, independently of one another, accounts in each case for at least 10% of the total weight of the particle.

18. Plastisol based on a halogen-free polymer according to claim 1, characterized in that the polymer contains not more than 1.4% by weight of surfactants.

19. Plastisol based on a halogen-free polymer according to claim 18, characterized in that the polymer contains not more than 0.3% by weight of surfactants.

20. Plastisol based on a halogen-free polymer according to claim 1, characterized in that the emulsifier used to prepare the polymer is an alkyl sulphate.

21. Plastisol based on a halogen-free polymer according to claim 1, characterized in that the polymer particles have undergone agglomeration to secondary particles having an average particle size of 5-500 μm.

22. Process for preparing plastisols based on a halogen-free polymer according to claim 1, characterized in that
a) the polymer is prepared by emulsion polymerization, which where appropriate is performed multi-stagedly,
b) the polymer is converted into a powder by drying of the resultant dispersion, and this powder,
c) is subsequently admixed with at least one plasticizer and where appropriate with adhesion promoters and/or fillers and, where appropriate, further constituents typical of plastisols.

23. Process for preparing plastisols based on a halogen-free polymer according to claim 22, characterized in that, for the preparation of the polymer, an initiator solution is introduced as an initial charge and a monomer emulsion is metered in, to which, at temperatures between 50° C. and 100° C., where appropriate, further monomer emulsions are metered in.

24. Process for preparing plastisols according to claim 22, characterized in that different monomer emulsions are metered in.

25. Process for preparing plastisols according to claim 22, characterized in that the metering in of the second and each further monomer emulsion takes place at 70-95° C.

26. Process for preparing plastisols according to claim 22, characterized in that 100 parts by weight of binder are admixed with 50-300 parts by weight of plasticizer, 40-120 parts by weight of adhesion promoter and/or 0-300 parts by weight of fillers.

27. Process for preparing plastisols according to claim 22, characterized in that the dispersions are dried by means of spray drying.

28. A coating of a metallic surface comprising the plastisol according to claim 1.

29. Coated metallic surface, characterized in that coating takes place with a plastisol according to claim 1, where appropriate after electrodeposition coating beforehand.

30. A method for protecting an underbody comprising: applying the plastisol according to claim 1 on an underbody.

31. A method of masking a seam, comprising: applying the plastisol according to claim 1 on a seam.

32. A method of damping metal-panel vibrations comprising: applying the plastisol according to claim 1 on a metal panel.

* * * * *